US006963273B2

(12) United States Patent
O'Brien et al.

(10) Patent No.: US 6,963,273 B2
(45) Date of Patent: Nov. 8, 2005

(54) THERMAL MONITORING SYSTEM FOR A TIRE

(75) Inventors: George Phillips O'Brien, Piedmont, SC (US); John David Adamson, Simpsonville, SC (US)

(73) Assignee: Michelin Recherche et Technique S.A., Granges-Pacot (CH)

( * ) Notice: Subject to any disclaimer, the term of this patent is extended or adjusted under 35 U.S.C. 154(b) by 98 days.

(21) Appl. No.: 10/681,962

(22) Filed: Oct. 9, 2003

(65) Prior Publication Data

US 2005/0088292 A1 Apr. 28, 2005

(51) Int. Cl.[7] .............................................. B60C 23/00
(52) U.S. Cl. ....................... 340/443; 340/449; 340/588
(58) Field of Search ................ 340/442, 443, 340/449, 588, 870.17; 73/146

(56) References Cited

U.S. PATENT DOCUMENTS

| | | | |
|---|---|---|---|
| 4,570,152 A | | 2/1986 | Melton et al. |
| 5,353,020 A | * | 10/1994 | Schurmann ................. 340/442 |
| 5,436,612 A | | 7/1995 | Aduddell |
| 6,028,508 A | | 2/2000 | Mason |
| 6,255,940 B1 | | 7/2001 | Phelan et al. |
| 6,259,361 B1 | * | 7/2001 | Robillard et al. ........... 340/442 |
| 6,297,439 B1 | | 10/2001 | Browne |
| 6,448,891 B2 | * | 9/2002 | Barnett ........................ 340/442 |
| 6,748,797 B2 | * | 6/2004 | Breed et al. ................. 340/443 |
| 2003/0117275 A1 | * | 6/2003 | Watkins ....................... 340/442 |
| 2003/0201044 A1 | * | 10/2003 | Schick ......................... 340/442 |
| 2004/0196147 A1 | * | 10/2004 | Albuquerque ............... 340/442 |

OTHER PUBLICATIONS

U.S. Patent Application MIC–35 (P50–0016) "Acoustic Signal Monitoring System For A Tire" filed Oct. 9, 2003.

* cited by examiner

*Primary Examiner*—Thomas Mullen
(74) *Attorney, Agent, or Firm*—Dority & Manning, P.A.

(57) ABSTRACT

A thermal monitoring system for use with a tire is provided. The system includes one or more thermal sensors that are carried by a vehicle. One of the thermal sensors may produce a first sensor output signal that is representative of the temperature of a first location on the tire. Additionally, a second sensor output signal may be produced that is representative of the temperature of a second location on the tire. A signal processing device is included that receives the first and second sensor output signals. The signal processing device produces a processing device output signal that is representative of a potential damage condition of the tire. This signal is produced in response to a particular temperature difference between the first and second locations as indicated by the first and second sensor output signals. An indication device receives the processing device signal and indicates to a user of the vehicle that the tire is experiencing a potential damage condition.

34 Claims, 9 Drawing Sheets

THERMAL MONITORING SYSTEM FOR A TIRE

TECHNICAL FIELD

The present invention relates generally to tires and tire assemblies for pneumatic tubeless tires. More particularly, the present invention relates to a thermal monitoring system for use with a tire for indicating the temperature of the tire, and/or whether the tire is in an undesirable condition for operation.

BACKGROUND

Pneumatic tires which support the vehicle should be properly maintained by the operator of the motor vehicle to ensure the best possible performance and safety of the vehicle. In certain instances such as when tires are under-inflated, overloaded, and driven in hot climates the tire may experience damage, including tread belt separation. Here, the radial belt becomes separated from the tread section of the tire rendering the tire unusable.

A precursor to tread belt separation may be excessive heating in certain portions of the tire. Increased tire temperature may be associated with impending tire damage in addition to being associated with tread belt separation. Measurement of the temperature of a tire is relatively simple when the motor vehicle is not moving. However, it becomes a difficult parameter to measure during times when the vehicle is being operated. Prior monitoring systems have sought to measure the temperature of a tire by incorporating a temperature monitoring system with at least one of the components inside of the tire.

Prior measuring systems have incorporated temperature sensors located in a device that is attached to an interior wall of the tire. These types of systems suffer from problems such as complexity, extra costs associated with mounting a unit inside the tire, and reduced tire performance. This may be a result of having a system mounted in a tire which will lead to an unbalancing of the tires resulting in uneven, faster wear of the tire. Poor handling abilities of the vehicle may also result. Additionally, stresses, strain, impact vibrations, and cyclic fatigue may damage the temperature system that is attached to the tire.

The present invention provides for a thermal detection system for use with a tire in order to inform a user of the motor vehicle that the tire is being subjected to an undesirable condition.

SUMMARY

Various features and advantages of the invention will be set forth in part in following description, or may be obvious from the description, or may be learned from practice of the invention.

The present invention provides for a system of detecting an undesirable condition in a tire, which may be for instance tread belt separation. In order to detect tread belt separation, a thermal monitoring system is provided in order to measure the temperature on the surface of the tire. Heat build up within the tire due to tread belt separation will eventually be conducted to the outside surface and can be evaluated by the thermal monitoring system in order to warn a driver that the tire is being subjected to an undesirable condition. The temperature at a first location of the tire may be recorded and compared to a temperature at a second location on the tire. A temperature difference between the first and second locations may indicate that tread belt separation is occurring.

The thermal monitoring apparatus includes a first thermal sensor that is carried by a vehicle. The first thermal sensor produces a first sensor output signal representative of the temperature of a first location on the tire. Additionally, the first thermal sensor may produce a second sensor output signal that is representative of the temperature of a second location on the tire. From here, a signal processing device receives the first and second sensor output signals and performs an evaluation of this data. A processing device output signal representative of a potential damage condition of the tire may be generated in response to a particular temperature difference between the first and second locations. An indication device receives the processing device output signal and indicates to a user of the vehicle that the tire is experiencing the potential damage condition.

Additionally, a second sensor may be incorporated into the thermal monitoring system in order to provide the same measurements as the first thermal sensor, only at different locations on the outer surface of the tire. Although the present invention is not limited to a particular temperature difference, in one exemplary embodiment of the present invention the temperature difference between the first and second locations may be at least five degrees Celsius in order to produce an appropriate signal to alert the driver.

The present invention also provides for an apparatus for monitoring a tire in which a pair of sensors are carried by a vehicle and sense the temperature at different locations on a tire. A signal processing device may be in communication with the pair of thermal sensors, and produce a processing device output signal representative of a potential damage condition of the tire. Further, an indication device may be in communication with the signal processing device, and may indicate to a user that the tire is experiencing a potential damage condition.

The present invention also provides for an apparatus for monitoring the condition of a tire where at least two sensors are carried by a vehicle and are positioned so as to sense the temperature at locations on at least two different tires of the vehicle. In this regard, a signal processing device is placed in communication with the sensors, and produces a processing device output signal representative of a potential damage condition of the tire. Again, an indication device may be placed in communication with the signal processing device and may indicate to a user of the vehicle that the tire is experiencing the potential damage condition.

The present invention also provides for exemplary embodiments where the thermal monitoring system is configured so as to reduce or eliminate the possibility of false tread belt separation alarms. A false alarm may occur, for instance, when the driver of the vehicle brakes hard in order to avoid an accident. This action will cause a localized temporary hot spot on the outer surface of the tire. In order to distinguish this situation from an actual situation of tread belt separation, the signal processing device may be configured so as to produce the processing device output signal only when at least an approximately five degree Celsius temperature difference is measured for a time period greater than approximately ten minutes.

Additionally, other configurations of the thermal monitoring system are possible in order to reduce false alarms and to accurately indicate a condition of tread belt separation. For instance, the signal processing device may produce the processing device output signal representative of a potential damage condition of the tire only when at least a five degree Celsius temperature difference is sensed and lasts for an increasingly longer amount of time over a predetermined time period. This would indicate that the hot spot on the outer surface of the tire is growing in size, and may be used as a criteria for warning the driver that tread belt separation is occurring.

Also, the signal processing device may be configured in order to produce the processing device output signal when an increasing temperature difference between the first and second locations occurs over a predetermined amount of time. This increase in temperature difference could be measured over a matter of days, weeks, or months.

The present invention also provides for a method that may be used for monitoring the condition of a tire. The method includes the steps of producing a first and second sensor output signal that are representative of the temperatures at a first and second location on the tire. The first and second sensor output signals may be received, and a processing output device signal may be produced. The processing device output signal is representative of a potential damage condition of the tire, and is made in response to a particular temperature difference as indicated by the first and second sensor output signals. Further, the method includes the step of indicating to a user that the tire is experiencing the potential damage condition.

It is to be understood that the present invention includes a thermal monitoring system that does not necessarily have to have one or more thermal sensors used to detect the temperature of the tire. For instance, in one exemplary embodiment of the present invention a thermal array is provided in place of the thermal sensors. The thermal array may measure the temperatures at two or more locations on the surface of the tire and provide the signal processing device with information to determine whether the potential for an undesirable condition such as tread belt separation is likely to occur.

DETAILED DESCRIPTION

Figure 1:
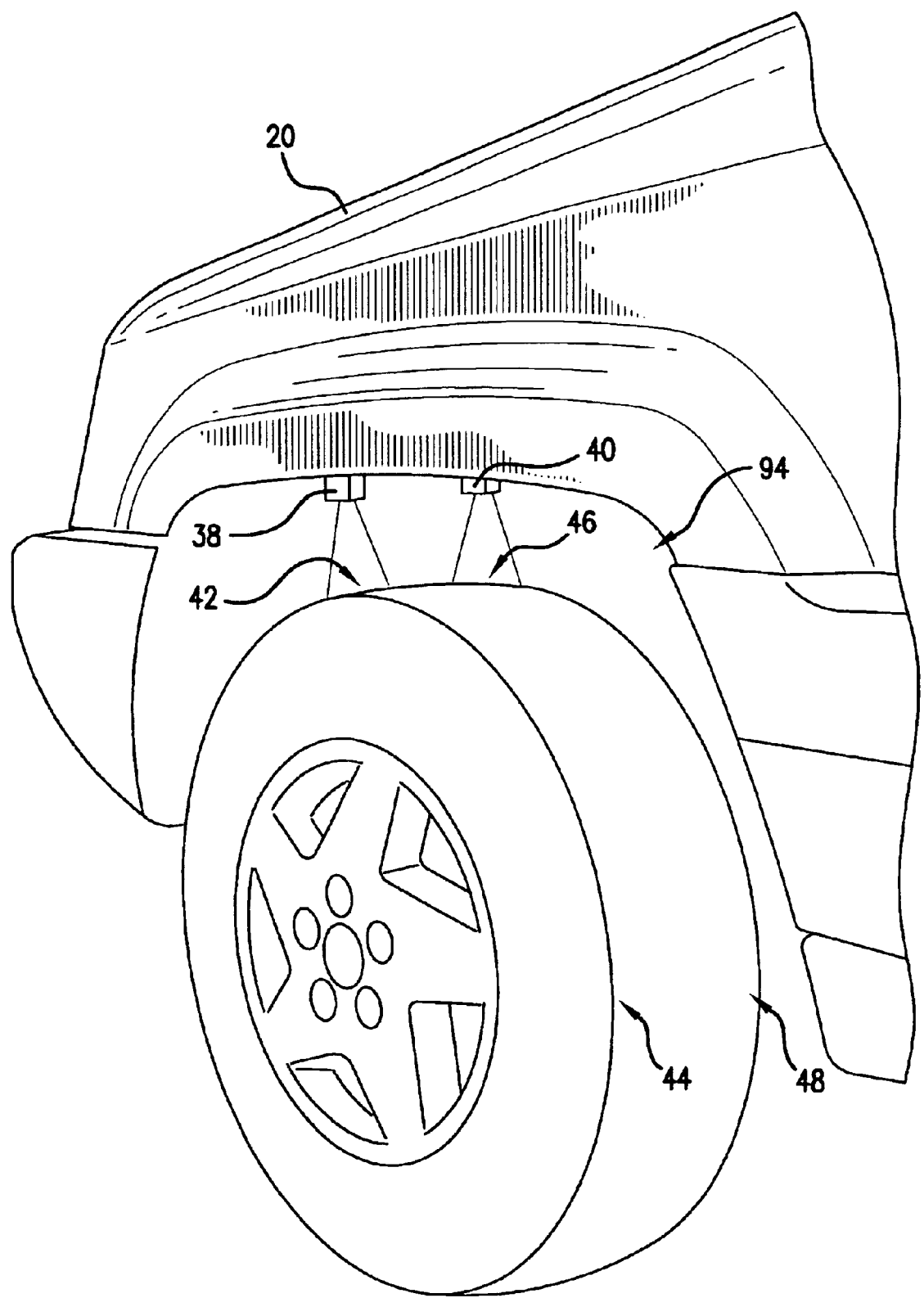
FIG. 1 is a perspective view of an exemplary embodiment of a thermal monitoring system for a tire in accordance with the present invention. A pair of thermal sensors are carried in the wheel well of a vehicle in order to obtain measurements from a tire.

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a thermal monitoring system for a tire. The system may include a thermal sensor 38 as shown in FIG. 1. The thermal sensor 38 may be an infrared sensor that is capable of measuring the temperature of an object. An object emits heat directly as a function of the temperature of the object. The thermal sensor 38 acts as a thermocouple in order to measure the energy emitted by the objects, and produce a signal proportional to this amount of energy. As such, the thermal sensor 38 may measure the temperature of an object without actually being in contact with the object.

Figure 2:
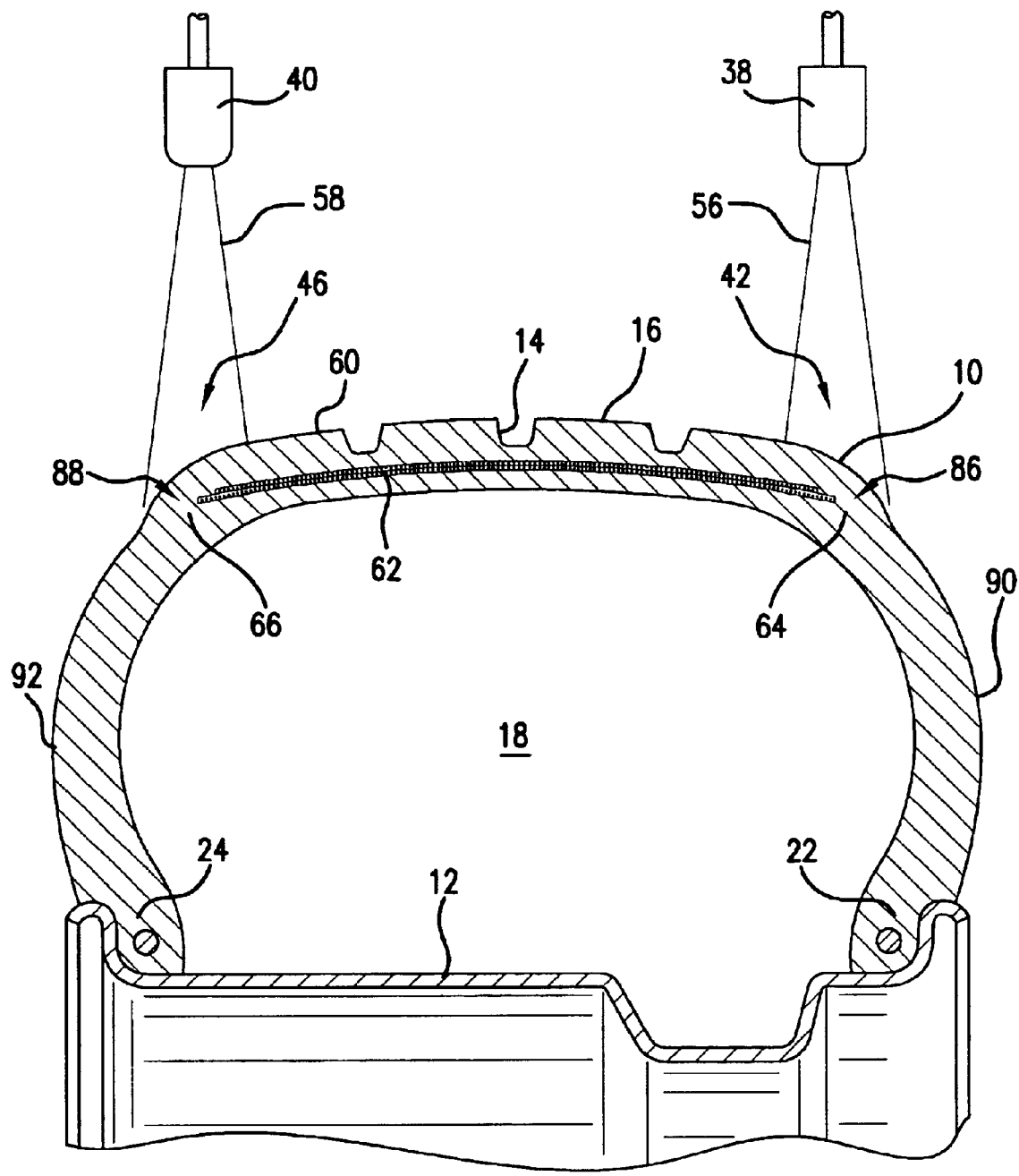
FIG. 2 is a partial cross-sectional view an exemplary embodiment of a thermal monitoring system in accordance with the present invention. A first and second thermal sensor are positioned so as to obtain temperature measurements from the outer surface of the tire.

In the present application, the use of a thermal sensor 38 is helpful in sensing the temperature of a tire in order to notify the driver of the motor vehicle that an undesirable condition, such as tread belt separation, may occur. FIG. 2 shows a cross-sectional view of a tire 10 and associated thermal sensors 38 and 40 in accordance with one exemplary embodiment of the present invention. The tire 10 includes a first side wall 90, a second sidewall 92, a first bead 22, a second bead 24, a radial belt section 62, and a crown 16 along with tread 14. The present invention may be used with any cross sectional configuration of the sidewalls 90 and 92, beads 22 and 24, radial belt section 62, and crown 16, and the present invention is not limited to the particular configuration shown in FIG. 2. As such, any type of pneumatic or non-pneumatic tire 10 may be used in accordance with the present invention.

Further, the tire tread 14 used in the present invention may be of any variety, and is not limited to any particular type. The sidewalls 90 and 92 extend from the crown 16. The first bead 22 is present at one end of the first sidewall 90, and the second bead 24 is present at one end of the second sidewall 92. A cavity 18 is defined between the wheel rim 12 and the tire 10. If the integrity of the tire structure is damaged, portions of the tire 10 may generate heat through the rubbing of delaminated or separated tire components. As the components of the tire 10 continue to separate, they may eventually detach from one another. Tread belt separation is one such condition. Tread belt separation typically occurs in portions of the tire 10 marked as separation zones 86 and 88. Separation zone 86 is located proximate to a first side edge 64 of the radial belt section 62. Likewise, the separation zone 88 is located proximate to a second side edge 66 of the radial belt section 62.

Heat may be generated in the separation zones 86 and 88 through the rubbing of loose wires in the radial belt section 62 that touch one another. Over time, this heat will be conducted to the outer surface 60 of the tire and form a hot spot thereon. The present invention therefore senses this heat on the outer surface 60 of the tire 10 in order to determine that an undesirable condition in the tire 10 is taking place.

An exemplary embodiment of the present invention in shown in FIG. 1 where a first and second thermal sensor 38 and 40 are located in a wheel well 94 of a vehicle 20. The thermal sensors 38 and 40 may be connected to the wheel well 94 by any suitable connection device known in the art, such as for instance screws, bolts, and/or clamps. Additionally, it is not necessary that the sensors 38 and 40 be located in the wheel well 94. In other exemplary embodiments of the present invention, the sensors 38 and 40 may be located on the undercarriage of the vehicle 20. The first thermal sensor 38 is positioned so as to measure the temperature of a first location 42 on the tire 10. Upon rotation of the tire 10, the first location 42 will be moved out of a first field of view 56 of the first thermal sensor 38, and eventually a second location 44 will be moved into the first field of view 56 of the first thermal sensor 38. At this point in time, the temperature of the second location 44 may be measured. As can be appreciated, the first thermal sensor 38 is located so as to be able to measure a section of the tire 10 around the entire circumference of the tire 10 due to rotation of the tire 10. It is therefore the case that an infinite number of locations may be measured around the circumference of the tire 10 that come within the first field of view 56 of the first thermal sensor 38.

The second thermal sensor 40 is positioned so as to be able to measure a third location 46 on the tire 10. As with the first thermal sensor 38, the second thermal sensor 40 may measure various locations about the circumference of a section of the tire 10. One such location is a fourth location 48 that will be measured by the second thermal sensor 40 upon rotation of the tire 10 and movement of the fourth location 48 into a second field of view 58 of the second thermal sensor 40.

Figure 10:
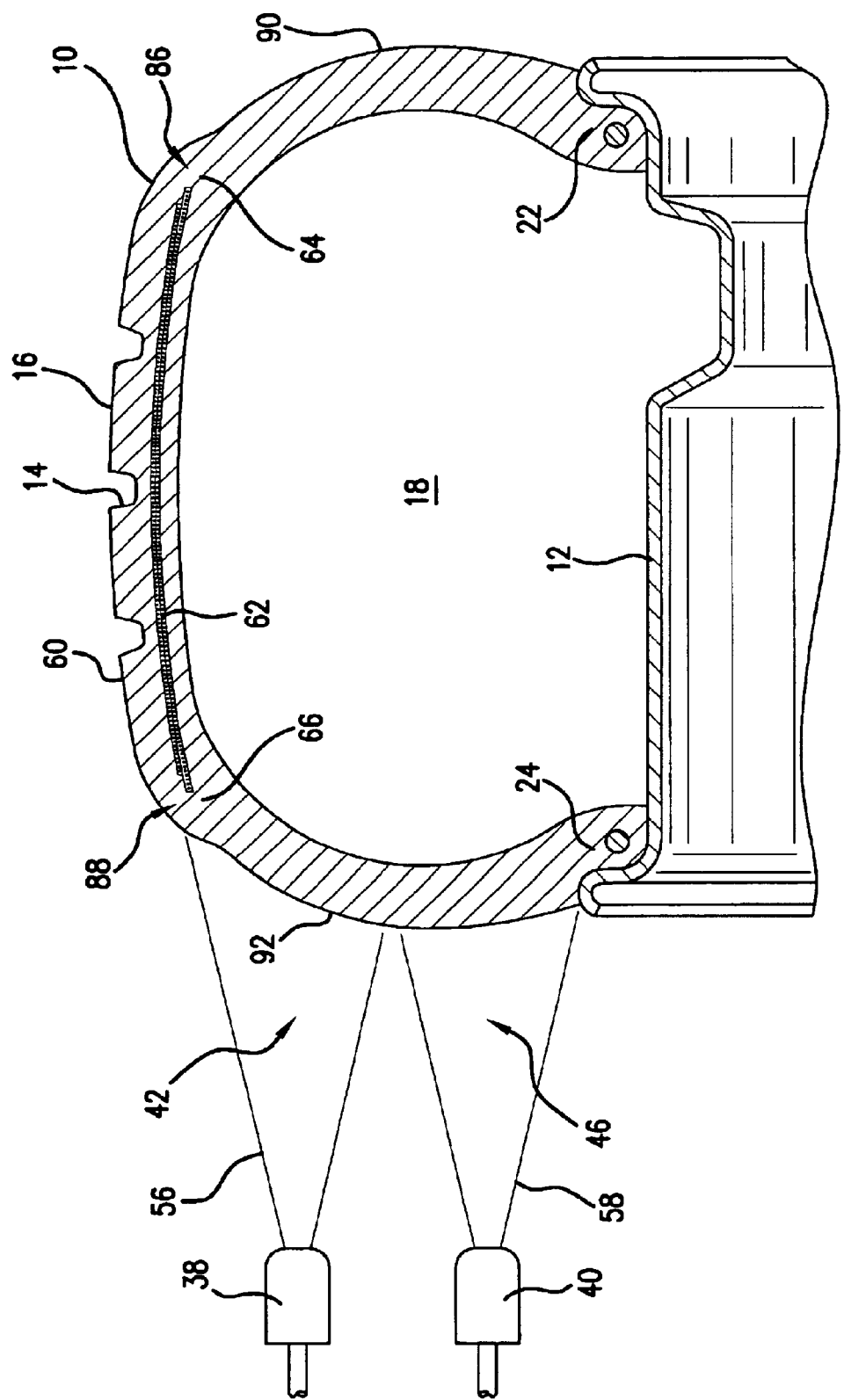
FIG. 10 is a partial cross-sectional view of an exemplary embodiment of a thermal monitoring system in accordance with the present invention. The first and second thermal sensors are positioned so as to obtain temperature measurements from the outer surface of a sidewall of the tire.

Alternatively, the first and/or second thermal sensors 38, 40 may be positioned such that one or more of the sidewalls 90, 92 are within the field of views 56, 58 of the sensors 38, 40. Such an exemplary embodiment is shown in FIG. 10 in which the temperature of the second sidewall 92, here the inboard sidewall, is measured.

Referring back to FIG. 2, the first thermal sensor 38 is shown as having its first field of view 56 projected onto the outer surface 60 of the tire 10 at the first location 42. Likewise, the second field of view 58 from the second thermal sensor 40 encompasses the third location 46 on the outer surface 60 of the tire 10. The fields of view 56 and 58 of the sensors 38 and 40 may be determined by the construction of the thermal sensors 38 and 40. Different thermal sensors 38 and 40 having differently sized and shaped fields of view 56 and 58 may be employed in accordance with other exemplary embodiments of the present invention.

Further, the positioning of the first and second thermal sensors 38 and 40 either closer to or away from the tire 60 will influence the fields of view 56 and 58 projected onto the tire 60 in certain exemplary embodiments of the present invention. For instance, if the thermal sensors 38 and 40 are positioned close to the tire 10, the fields of view 56 and 58 on the outer surface 60 will be relatively small. These fields of view 56 and 58 on the outer surface 60 will increase as the thermal sensors 38 and 40 are moved away from the outer surface 60. The present invention contemplates various positionings of the thermal sensors 38 and 40 in order to attain the desired temperature readings. However, certain thermal sensors 38 and 40 in accordance with one exemplary embodiment of the present invention provide a more accurate temperature reading the closer the thermal sensors 38 and 40 are to the outer surface 60. It is to be understood that other exemplary embodiments of the present invention include arrangements where the thermal sensors 38 and 40 are positioned away from the outer surface 60 in order to obtain a temperature measurement over larger portions of the tire 10.

Figure 5:
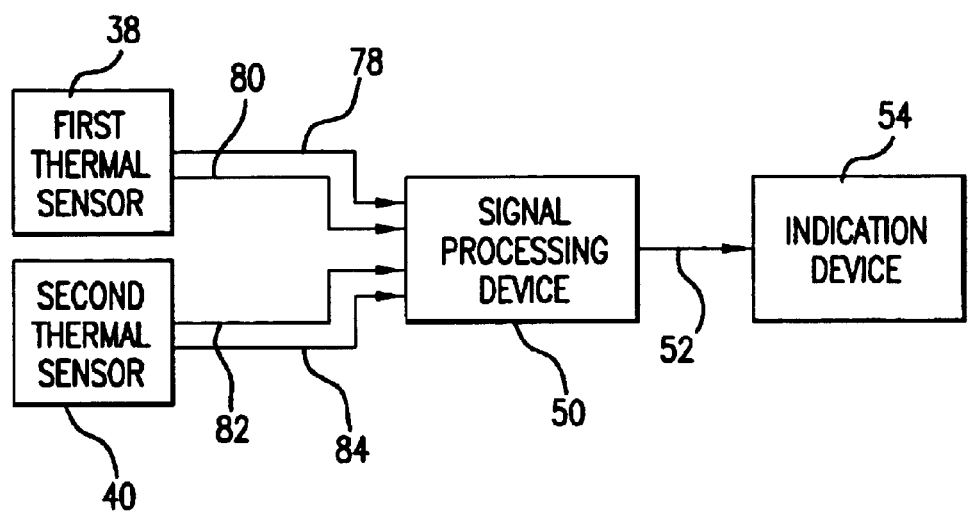
FIG. 5 is a schematic view of an exemplary embodiment of a thermal monitoring system in accordance with the present invention. A signal processing device receives input from a first and second thermal sensor, and produces a processing device output signal that is received by an indication device.

As previously stated, an undesirable condition in the edge zones 86 and 88 may create excess heat in these areas which will eventually be conducted to the outer surface 60 of the tire 10 at the first location 42 and the third location 46. This excess heat may be measured by the thermal sensors 38 and 40. FIG. 5 is a schematic view showing the first thermal sensor 38 having a first and second output signal 78 and 80. The first sensor output signal 78 may be representative of the temperature obtained through measurement of the first location 42, and the second sensor output signal 80 may be representative of the temperature at the second location 44. The first and second sensor output signals 78 and 80 may in one exemplary embodiment be a single output from the same sensor, read at different points in time as the tire 10 rotates. These signals are input into a signal processing device 50, which in one exemplary embodiment of the present invention may be a microprocessor. The signal processing device 50 may be any form of circuitry, such as for instance a digital signal processing circuit that is capable of processing signals from the first and second sensors 38 and 40 in order to determine whether a processing device output signal 52 should be generated. The design and/or selection of an appropriate signal processing device 50 is known to those skilled in the art, and the present invention includes exemplary embodiments having various types and configurations of signal processing devices 50.

Likewise, the second thermal sensor 40 generates a third and fourth sensor output signal 82 and 84. The third sensor output signal 82 may be representative of a temperature of a third location 46 on the tire 10, while the fourth sensor output signal 84 is representative of the temperature on a fourth location 48 of the tire 10. These two signals 82 and 84 are also transmitted to the signal processing device 50 as are the signals from the first thermal sensor 38. Again, the third and fourth sensor output signals 82 and 84 may be a single output from the same sensor, read at different points in time as the tire 10 rotates.

Transmission of the signals 78, 80, 82, and 84 to the signal processing device 50 may be through either a hard-wired connection or a wireless transmission. Additionally, there may be two signal processing devices 50 employed, one for each thermal sensor 38 and 40. In such an arrangement, the signal processing device 50 and the first thermal sensor 38 may be formed as one integral unit, while the second thermal sensor 40 and the signal processing device 50 likewise form a separate integral unit. Additionally, the present invention includes exemplary embodiments where signals from all four tires 10 on the vehicle are transmitted to a central signal processing device 50 for evaluation. Alternatively, four separate signal processing devices 50 may be present on the vehicle 20, each of the signal processing devices 50 receiving input signals from sensors 38 and 40 located at each one of the four tires 10 on the vehicle 20. Additionally, if the vehicle 20 has fewer than or more than four tires 10, the signal processing device 50 and sensors 38 and 40 may be numbered and sized accordingly. As such, the present invention includes various exemplary embodiments where one or more than one signal processing device 50 is employed on the vehicle 20 in order to evaluate sensor readings and produce the processing device output signal 52.

Figure 6:
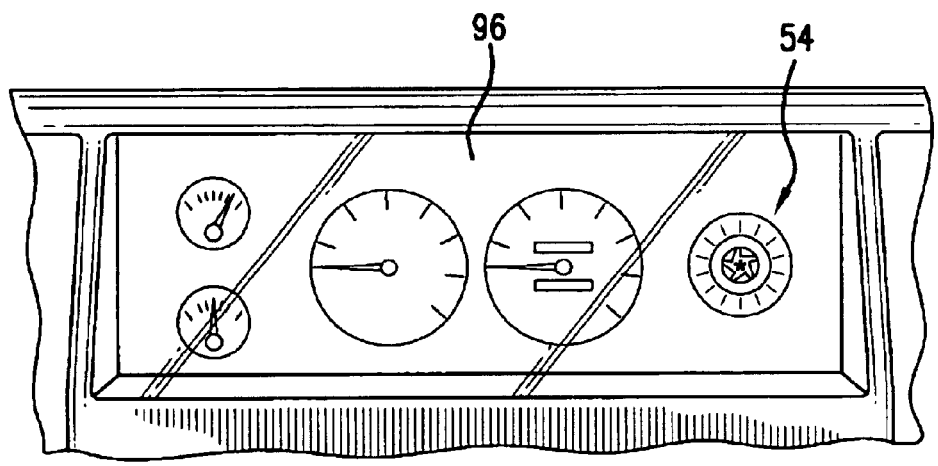
FIG. 6 is a front plan view of a dashboard of a vehicle in accordance with one exemplary embodiment of the present invention. Here, the indication device is a light that may be illuminated on the instrument cluster displayed to the driver of the vehicle.

The processing device output signal 52 is communicated either through a hard-wired connection or a wireless transmission to an indicator device 54. The indicator device 54 may be a computer in the vehicle 20 that is capable of displaying a signal to the driver of the vehicle 20 in order to inform the driver that an undesirable condition is being imparted on to one or more of the tires 10. The indication device 54 may be a lamp, a light emitting diode, a gage, or an audio indicator in various exemplary embodiments of the present invention. As such, the present invention is not limited to a particular form of indication device 54, but may take any form known to those skilled in the art. For instance, FIG. 6 shows an indication device 54 located in an instrument cluster 96 in the dashboard of a vehicle 20. The indication device 54 is a light that illuminates when a tire 10 is subjected to an undesirable condition, such as for instance tread belt separation, and informs the driver of the vehicle 20 of this condition through an illuminated icon representative of a tire.

As defined herein, the processing output device signal 52 is a signal that indicates an undesirable condition on the tire 10. It is to be understood that other signals may be sent from the signal processing device 50 which indicates other conditions of the tire 10, for instance a signal that indicates normal operations.

It is to be understood that other configurations of the thermal sensors 38, 40 are possible in accordance with various exemplary embodiments of the present invention. For instance, the present invention provides for an exemplary embodiment where the first and second thermal sensors 38, 40 are each positioned so as to sense the temperature at different locations on the tire 10. In this regard, the signal processing device 50 may produce the processing device output signal 52 in response to a temperature difference, temperature fluctuation, or other comparison of temperatures between the different locations on the tire 10 as measured by the first and second thermal sensors 38, 40 upon a comparison of the temperatures measured by the first thermal sensor 38 to the second thermal sensor 40. As such, it is to be understood that the present invention includes exemplary embodiments where the processing device output signal 52 is generated upon not only temperatures sensed by the first thermal sensor 38 or second thermal sensor 40, but also may be generated upon noting the temperature sensed by both the first thermal sensor 38 and the second thermal sensor 40.

Additionally, the present invention provides for exemplary embodiments where the first and second thermal sensors 38, 40 may be positioned so as to sense the temperature at locations on different tires 10 of the vehicle 20. In this regard, the processing device output signal 52 may be generated upon comparison of the temperature on one tire 10 of the vehicle to temperatures on the other tire 10 of the vehicle 20. Further, the temperature on any number of the tires 10 of the vehicle 20 may be sensed in accordance with the present invention. For instance, in a typical passenger vehicle 20, all four of the tires 10 may be provided with at least one sensor so as to measure the temperature on at least one location of each of the tires 10. In this regard, the processing device output signal 52 may be generated upon a comparison of the temperatures measured at any of the tires 10, and may be, for instance, generated upon a comparison between the temperatures sensed between two different tires 10. In one exemplary embodiment of the present invention, the processing device output signal 52 may be generated upon comparison of a temperature difference between the front tires 10 of the vehicle. Likewise, the processing device output signal 52 may be generated upon a comparison of the temperatures sensed between the two different back tires 10 of the vehicle. It is to be noted that it may not be useful to compare temperatures sensed between the front tires 10 and the back tires 10 of the vehicle due to operational differences that exists between the front tires 10 and the back tires 10. However, it is to be understood that in accordance with various exemplary embodiments of the present invention, that the processing output device output signal 52 may be generated upon a comparison of the differences of the front and back tires 10 of the vehicle 20.

The signal processing device 50 may be configured in various manners in order to produce the processing output device signal 52 in response to input signals from the first and second thermal sensors 38 and 40. In one such instance, the processing output device signal 52 may be generated upon a predetermined rise in temperature sensed by the first or second thermal sensors 38 or 40. Alternatively, the processing device output signal 52 may be generated in response to a temperature difference noted, for instance, by the first thermal sensor 38 upon comparison of the temperature at the first location 42 versus the third location 46. As previously mentioned, heat build up due to tread belt separation may cause the first location 42 to be at a higher elevation than other sections of the tire 10 such as the third location 46 that are not experiencing heat build up due to tread belt separation. In alternative exemplary embodiments of the present invention, it is desired to configure the signal processing device 50 in order to minimize or eliminate the possibility of false alarms. A false alarm could be caused, for instance, upon a driver braking hard and locking the tires 10. This action may cause a temporary localized hotspot on the outer surface 60 on the tire 10. This temporary localized hotspot could be sensed by one of the first or second thermal sensors 38 and 40 and interpreted by the signal processing device 50 to be a condition representative of tread belt separation. Repeated false alarms as indicated by the indication device 54 may eventually train the driver to ignore the indication device 54 even when an actual condition of tread belt separation is sensed by the system.

Figure 4:
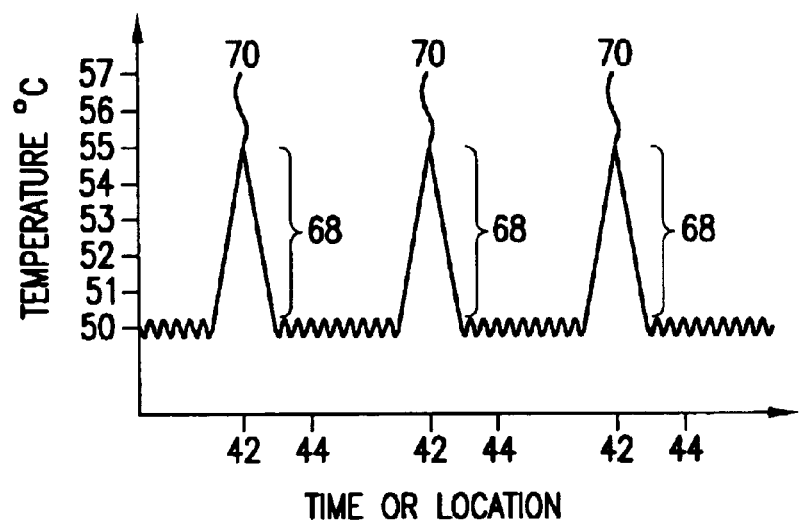
FIG. 4 is an elevation view of a tire being measured by a thermal sensor, and an associated graph of the measured temperature readings at various locations on the outer surface of the tire. A five degree temperature spike is shown being measured at a first location of the tire relative to a second location of the tire.
Figure 4:
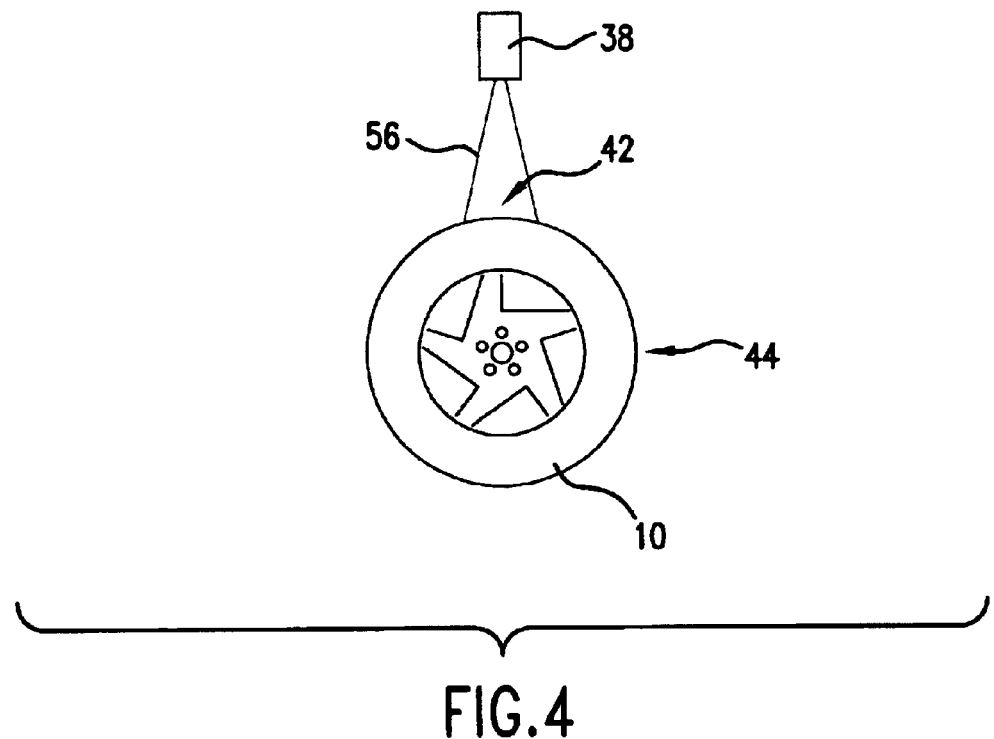

The present invention may be configured in order to reduce or eliminate false alarms detected by the system. For instance, FIG. 4 shows one such configuration where the signal processing device 50 is configured to reduce the chances of a false detection. As can be see in FIG. 4, the tire 10 is rotated such that the first location 42 is sensed by the first thermal sensor 38, and subsequently the second location 44 is likewise sensed by sensor 38. A graph of time or location versus temperature is shown. The horizontal axis of the graph in FIG. 4 shows temperature readings at consecutive locations on the outer surface 60 of the tire 10. As can be seen, these readings are repetitive due to the fact that the tire 10 will rotate and produce data representative of the temperature at various locations on the tire 10 over a course of time. In this exemplary embodiment of the present invention, the majority of the outer surface 60 of the tire 10 is measured to be at a temperature of 50 degrees Celsius. This is true every time the second location 44 of the tire 10 is measured by the first thermal sensor 38. However, the first location 42 is experiencing a heat increase due to tread belt separation. This heat increase is shown as a temperature spike 70 in the graph. The temperature difference 68 between the first location 42 and the second location 44 is measured as a five degree Celsius temperature difference 68. These temperature spikes 70 occur every time the first thermal sensor 38 measures the first location 42. In certain exemplary embodiments, the first and second thermal sensors 38 and 40 may be configured to measure over a fifty millisecond time period a five degree Celsius temperature difference between the locations 42 and 44 and between locations 46 and 48. Other exemplary embodiments, for instance those shown in FIGS. 7 and 8, may also measure over a fifty millisecond time period.

In order to reduce the chances of a false alarm, the signal processing device 50 may generate the processing device output signal 52 representative of an undesired condition imparted on to the tire 10 only when a five degree or greater Celsius temperature difference 68 is measured for a period of time greater than approximately ten minutes. This period of time should be sufficient in order to eliminate isolated occurrence of a temperature rise on the outer surface 60 of the tire which may not be attributable to tread belt separation or any undesired condition sought to be measured by the system of the present invention. It is to be understood that these temperatures and time values are only indicative of an exemplary embodiment of the present invention, and that the invention is not so limited.

Figure 7:
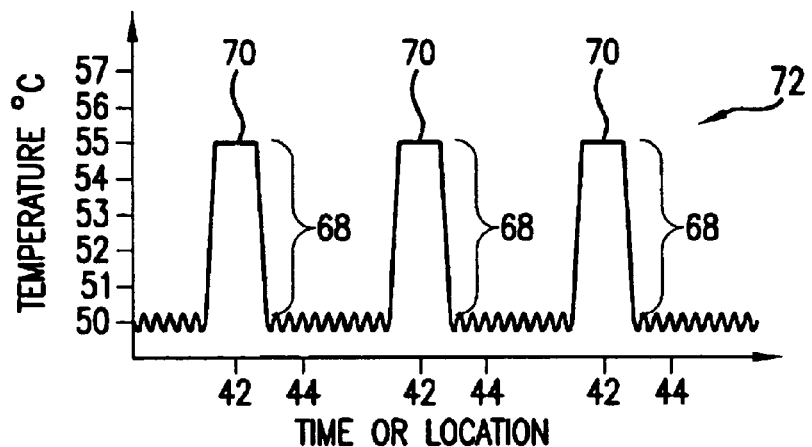
FIG. 7 is an elevation view of a tire being measured by a thermal sensor, and a pair of associated graphs showing the measured temperature at various locations on the outer surface of the tire. Each graph shows temperature readings at various points in time, and demonstrates an increase in the size of a hot spot on the outer surface of the tire.
Figure 7:
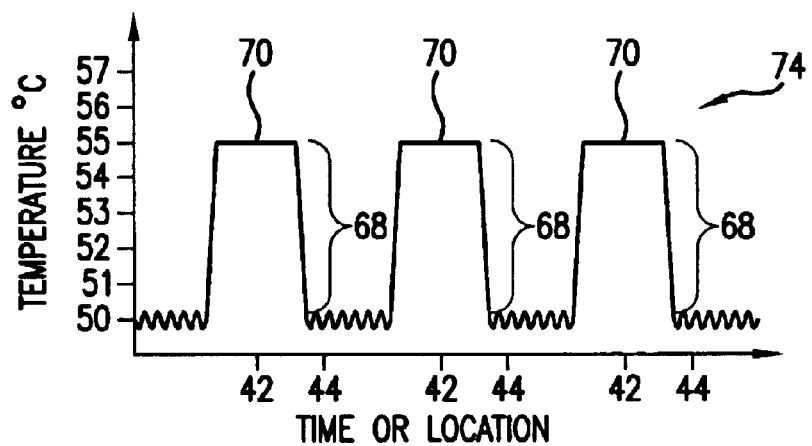
Figure 7:
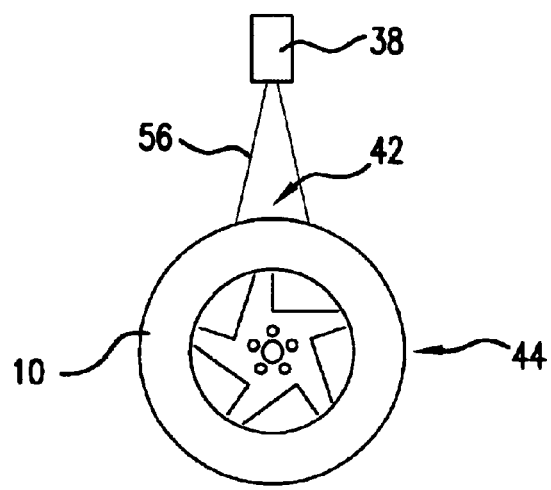

Other configurations of the signal processing device 50 are possible in order to reduce the chances of a false detection. FIG. 7 shows another configuration where the tire 10 is again measured at the first and second locations 42 and 44 by the first thermal sensor 38. Here, a pair of graphs are shown which again indicate a time or location position versus a temperature reading. Readings from an earlier time 72 are shown. A temperature spike 70 of five degrees Celsius occurs at the first location 42 with respect to the second location 44. Readings from a later time 74 show the same tire 10 being measured. This later time may be, for instance, a day, a week, a month, or three months from the readings from an earlier time 72.

The readings from the later time 74 also show the temperature spike 70 at the first location 42. However, the temperature spike 70 is longer at this location than that previously recorded from the readings from the earlier time 72. This increase in time or location indicates that the hot spot at the first location 42 is growing circumferentially around the outer surface 60 of the tire 10. In essence, a larger hot spot is being measured. This condition is indicative of tread belt separation and may be sensed by the signal processing device 50 in order to both detect tread belt separation and eliminate the potential of a false alarm. In one exemplary embodiment of the present invention, the time or location difference is an increase of 25%. The temperature difference 68 measured at both the earlier and later times 72 and 74 is greater than or equal to approximately five degrees Celsius. At this point, the signal processing device 50 may look for an additional criterion in order to determine whether tread belt separation is occurring, or whether a false alarm is being detected. This further criterion may be an increase in the size of the hot spot on the outer surface 60 of the tire 10.

Figure 8:
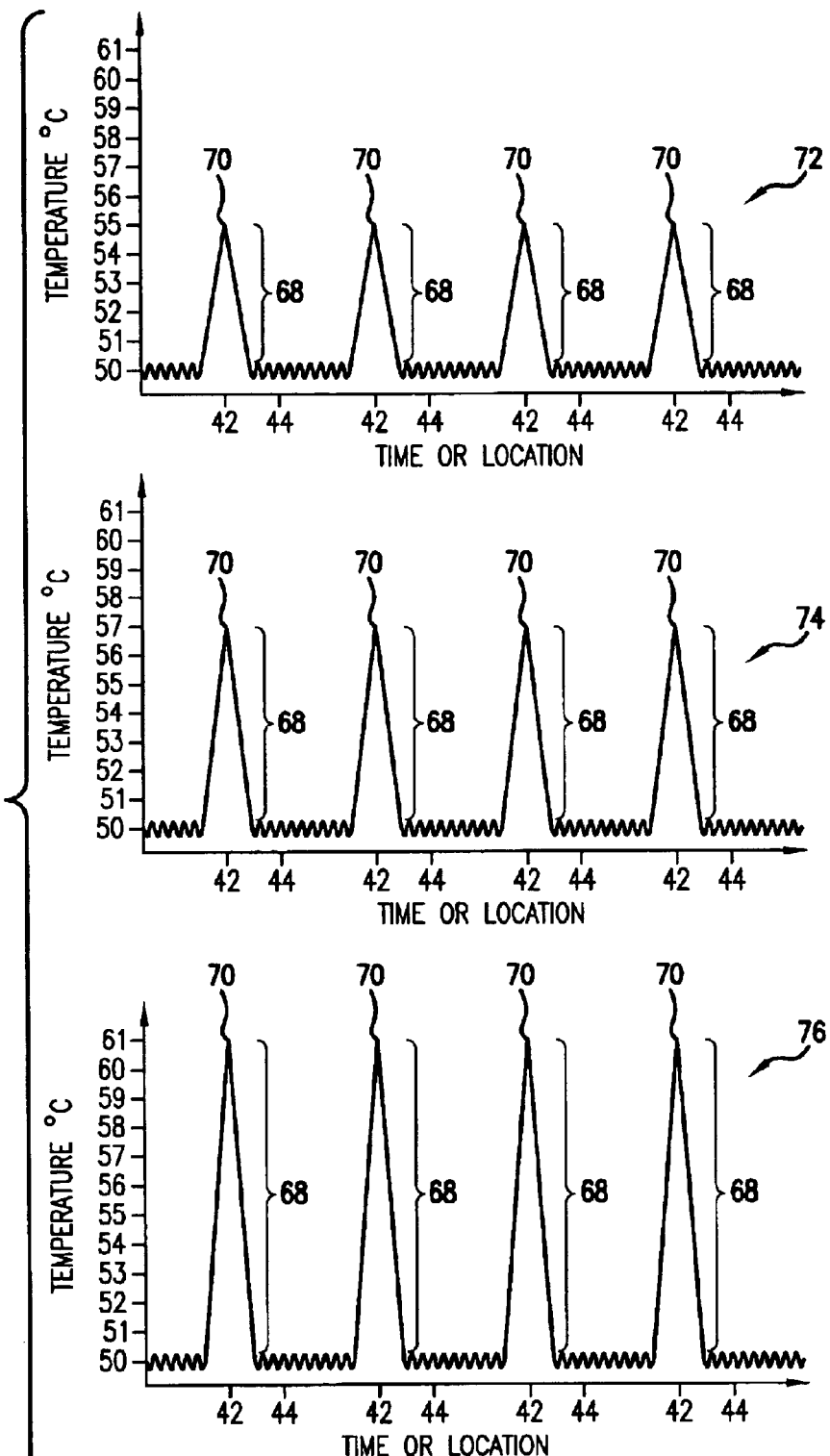
FIGS. 8 and 8A are an elevation view of a tire being measured by a thermal sensor, and three associated graphs representing temperature measurements taken at various locations on the outer surface of the tire. The three graphs show measurements at three different points in time, and show an increase in the temperature difference at a first location from one point in time to the next.
Figure 8A:
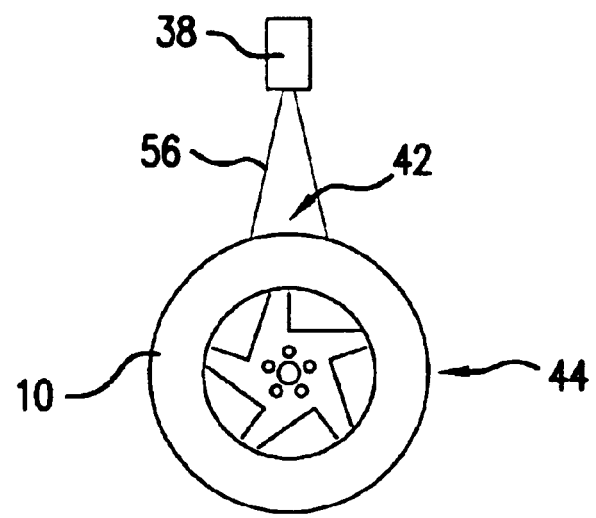

A further configuration of the present invention includes another mechanism for detecting tread belt separation while eliminating the potential of false alarms. FIGS. 8 and 8A show a configuration where again the tire 10 is measured at the first and second locations 42 and 44. Here, the temperature difference 68 between the first and second locations 42 and 44 is measured at an earlier time 72. It is not necessary that the temperature difference 68 be five degrees Celsius. Temperature readings on the outside surface 60 of the tire 10 are again measured at a later time 74. Here, the temperature difference is recorded as being a two degree Celsius increase versus the temperature difference 68 recorded at the earlier time 72. Readings from an even later time 76 are recorded, and show the temperature spike 70 having an increased temperature difference 68 of four degrees Celsius from the previous measurements at time 74. As can be seen, the temperature measurements at times 72, 74, and 76 show an increasing temperature difference 68 of the temperature spike 70 during a progression of time. This increase in the temperature difference 68 over a predetermined amount of time may be used to instruct the signal processing device 50 to produce the processing device output signal 52 in order to alert the driver of the vehicle 20 that tread belt separation or another undesirable condition is occurring. In one exemplary embodiment of the present invention, a five degree or greater Celsius temperature difference may be measured over a period of two months in order to generate the processing device output signal 52 in order to warn the driver. However, various temperature differences 68 and amounts of time may be used in other exemplary embodiments of the present invention.

Comparing one tire 10 to another tire 10 of the vehicle 20 can also reduce false alarms. For example, if the driver brakes hard, the separate tires 10 will have similar localized hot spots. If the thermal pattern between the two tires 10 is similar, then driving conditions are probably the cause. This situation suggests a false alarm was indicated, and probably not tread belt separation.

Although described as using the first and second thermal sensors 38 and 40, in one exemplary embodiment of the present invention only a single sensor 38 is used as opposed to the pair of thermal sensors 38 and 40. Additionally, the thermal sensors 38 and 40 may be provided to measure the temperature on any number of the tires 10 of the vehicle 20.

Figure 3:
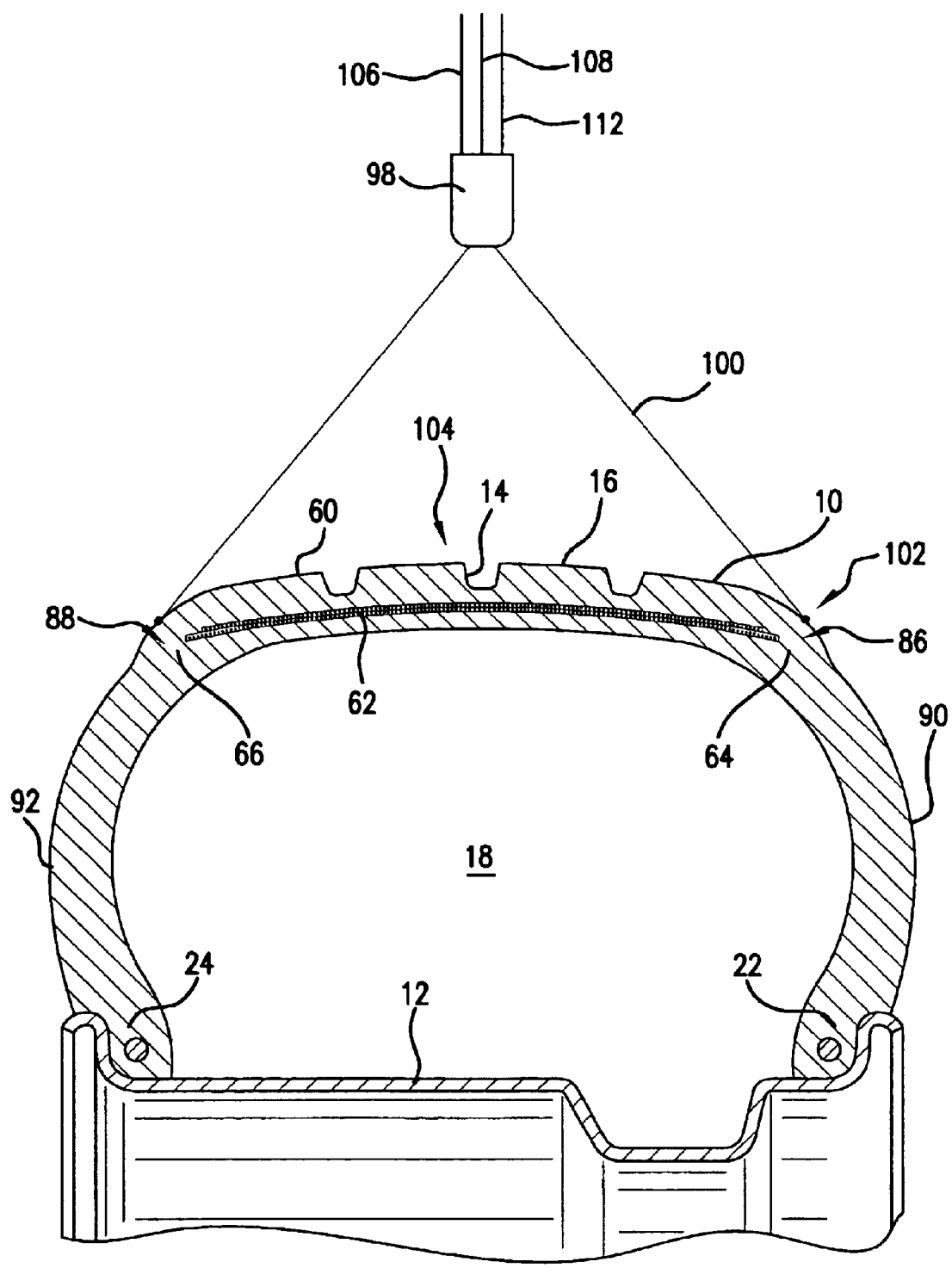
FIG. 3 is a partial cross-sectional view of an exemplary embodiment of a thermal monitoring system in accordance with the present invention. A thermal array is positioned so as to obtain temperature readings from the outer surface of the tire.

Additionally, the present invention also includes an exemplary embodiment where instead of the thermal sensors 38 and 40 being employed, a thermal array 98 may be used. FIG. 3 shows an exemplary embodiment where the thermal array 98 is positioned so as to have an array field of view 100 projected onto the tire 10. The thermal array 98 allows for various locations in the array field of view 100 to be measured. For instance, the thermal array 98 may be capable of measuring the temperature at a first array location 102 in addition to measuring the temperature at a third array location 104. In this manner, the temperature proximate to the tread belt separation zones 86 and 88 of the tire 10 may be measured by the single thermal array 98. Data from the thermal array 98 may be input into the signal processing device 50 and evaluated in a manner previously described in order to produce the processing device output signal 52. As such, the present invention includes any configuration where the temperature of the tire 10 is sensed by a device in order to determine whether the tire 10 is being subjected to an undesirable condition, such as tread belt separation.

Figure 9:
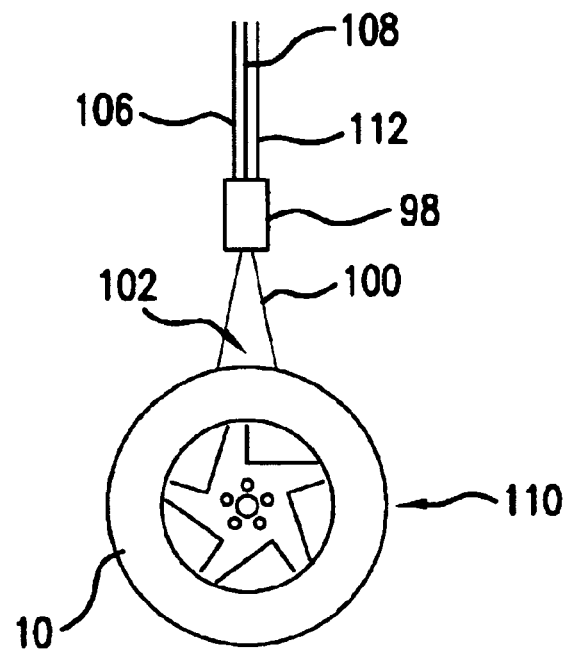
FIG. 9 is an elevation view of a tire being measured by a thermal array in accordance with one exemplary embodiment of the present invention.

FIG. 9 shows the tire 10 being measured by the thermal array 98. The first array location 102 is being measured while a second array location 110 is out of the array field of view 100. Upon rotation of the tire 10, the second array location 110 will be moved into the array field of view 100, and the first array location 102 will be moved out of the array field of view 100. A first array location output signal 106, a second array location output signal 108, and a third array location output signal 112 may all be output from the thermal array 98 into the signal processing device 50 for evaluation as previously discussed. The thermal array 98 allows for other locations on the outer surface 60 of the tire 10 to be measured, such as for instance the third array location 104. This information may be incorporated into the evaluation by the signal processing device 50, or may be used in other systems in the vehicle 20. The locations measured by the thermal array 98 may be those on the outer surface 60 proximate to the separation zones 86 and 88 as described above in regards to other exemplary embodiments.

It is to be understood that the present invention includes various exemplary embodiments where the processing device output signal 52 may be produced upon the sensing of temperature in different manners. As stated, the processing device output signal 52 may be generated upon having the first thermal sensor 38 sense a temperature greater than a predetermined limit and/or having the second thermal sensor 40 also sense a temperature greater than a predetermined limit, the first and second thermal sensors 38 and 40 being on the same tire 10. Additionally, the processing device output signal 52 may be produced upon taking the absolute value of the difference in temperature sensed between the first and second thermal sensors 38, 40 and having this absolute value be larger than a predetermined valve. Further, the processing device output signal 52 may be generated upon evaluating the change in temperature sensed by the first thermal sensor 38 over a period of time, this temperature change being greater than some predetermined value in order to generate the processing device output signal 52. Likewise, the change in temperature sensed by the second thermal sensor 40 over an amount of time may be calculated and the processing device output signal 52 may be generated should this value exceed some predetermined value.

Additionally, other exemplary embodiments of the present invention exist where the processing device output signal 52 is generated should the change in temperature sensed by the first thermal sensor 38 over the points measured on the tire 10 be greater than a predetermined value. Likewise, should the change in temperature sensed by the second thermal sensor 40 with respect to the locations measured by the second thermal sensor 40 on the tire 10 be greater than some predetermined value, the processing device output signal 52 may be generated. Sensing a temperature change upon comparing temperatures located around the tire as sensed by the same sensor will indicate a localized hot spot on the tire 10, hence prompting the generation of the processing device output signal 52.

Still further exemplary embodiments of the present invention exist where, for instance, the temperatures on a pair of tires 10 are measured and compared. In this regard, a pair of sensors may be placed on the first tire 10, and a pair of sensors may be placed on the second tire 10. In this regard, should the absolute value of the difference between the temperature sensed by one sensor on the first tire 10 and the temperature sensed by a sensor on the second tire 10 be greater than some predetermined value, the processing device output signal 52 may be generated. Likewise, the absolute value of the temperature difference between the temperature sensed by the second sensor on the first and second tires 10 may be calculated, and if this absolute value is larger than some predetermined value, the processing device output signal 52 may be generated. In one exemplary embodiment of the present invention, the predetermined values of the temperature differences as previously discussed may be 5 degree Celsius. Additionally, other configurations and ways of generating the processing device output signal 52 upon comparison of temperatures at one or more locations on one or more tires is possible in accordance with various exemplary embodiments of the present invention.

It should be understood that the present invention includes various modifications that can be made to the exemplary embodiments of the thermal monitoring system for a tire as described herein as come within the scope of the appended claims and their equivalents.

We claim:

1. An apparatus for monitoring the condition of a tire comprising:

a pair of sensors comprising a first and a second thermal sensor each to be carried by a vehicle, the first thermal sensor for sensing the temperature difference between a first and second location on the tire, the second thermal sensor for sensing the temperature difference between a third and fourth location on the tire;

a signal processing device in communication with the first and second thermal sensors, the signal processing device for producing a processing device output signal representative of a potential damage condition of the tire; and an indication device in communication with the signal processing device for indicating to a user of the vehicle that the tire is experiencing the potential damage condition.

2. The apparatus of claim 1, wherein the processing device output signal is produced in response to either a particular temperature difference between the first and second locations or a particular temperature difference between the third and fourth locations.

3. The apparatus of claim 2, wherein the particular temperature difference is at least five degrees Celsius.

4. The apparatus of claim 1, wherein:

the first and second locations are on the outer surface of the tire at a location proximate to a first side edge of a radial belt section of the tire, the second location circumferentially spaced from the first location; and the third and fourth locations are on the outer surface of the tire at a location proximate to a second side edge of a radial belt section of the tire, the fourth location circumferentially spaced from the third location.

5. The apparatus of claim 1, wherein the first and second thermal sensors are infrared sensors.

6. The apparatus of claim 1, wherein the first and second thermal sensors are configured to measure over a fifty millisecond time period at least a five degree Celsius temperature difference between the first and second locations and at least a five degree Celsius temperature difference between the third and fourth locations.

7. The apparatus of claim 1, wherein the signal processing device is configured to produce the processing device output signal representative of a potential damage condition of the tire only when at least an approximately five degree Celsius temperature difference between the first and second locations or at least a five degree Celsius temperature difference between the third and fourth locations occurs for a time period greater than approximately ten minutes.

8. The apparatus of claim 1, wherein the signal processing device is configured to produce the processing device output signal representative of a potential damage condition of the tire only when at least a five degree Celsius temperature spike is sensed by one of the first or second thermal sensors, and the spike lasts for an increasingly longer amount of time over a predetermined time period.

9. The apparatus of claim 1, wherein the signal processing device is configured to produce the processing device output signal representative of a potential damage condition of the tire only when an increasing temperature difference between the first and second locations or an increasing temperature difference between the third and fourth locations occurs over a predetermined amount of time.

10. The apparatus of claim 1, wherein the indication device is selected from the group consisting of a lamp, a light emitting diode, a gage, and an audio indicator.

11. An apparatus for monitoring the condition of a tire, the tire having a first and second location on the outer surface of the tire at a location proximate to a first side edge of a radial belt section of the tire, the second location on the outer surface of the tire and circumferentially spaced from the first location, the tire having a third and fourth location on the outer surface of the tire at a location proximate to a second side edge of the radial belt section of the tire, the fourth location on the outer surface of the tire circumferentially spaced from the third location; the apparatus comprising:

a pair of sensors comprising a first and a second thermal sensor each being carried by the vehicle, the first thermal sensor for sensing the temperature difference between the first and second locations on the tire, the second thermal sensor for sensing the temperature difference between the third and fourth locations on the tire;

a signal processing device in communication with the first and second thermal sensors, the signal processing device generating a processing device output signal representative of a potential damage condition of the tire, the processing device output signal being produced when at least an approximately five degree Celsius temperature difference between the first and second locations or at least an approximately five degree Celsius temperature difference between the third and fourth locations occurs for a time period greater than approximately ten minutes; and an indication device in communication with the signal processing device for indicating to a user of the vehicle that the tire is experiencing the potential damage condition.

12. An apparatus for monitoring the condition of a tire comprising:

a first thermal sensor carried by a vehicle, the first thermal sensor for producing a first sensor output signal representative of the temperature of a first location on a tire, and a second sensor output signal representative of the temperature of a second location on the tire;

a signal processing device for receiving the first and second sensor output signals, the signal processing device producing a processing device output signal representative of a potential damage condition of the tire in response to a particular temperature difference between the first and second locations as indicated by the first and second sensor output signals; and an indication device for receiving the processing device output signal and indicating to a user of the vehicle that the tire is experiencing the potential damage condition.

13. The apparatus of claim 12, wherein the particular temperature difference is at least five degrees Celsius.

14. The apparatus of claim 12, wherein the first and second locations are on the outer surface of the tire at a location proximate to a first side edge of a radial belt section of the tire, the second location is circumferentially spaced from the first location.

15. The apparatus of claim 12, further comprising a second thermal sensor to be carried by the vehicle, the second thermal sensor producing a third sensor output signal representative of the temperature of a third location on the tire, and a fourth sensor output signal representative of the temperature of a fourth location on the tire;

wherein the signal processing device receiving the third and fourth sensor output signals, and producing the processing device output signal in response to a particular temperature difference between the third and fourth locations as indicated by the third and fourth sensor output signals.

16. The apparatus of claim 15, wherein the temperature difference between the third and fourth locations is at least five degrees Celsius.

17. The apparatus of claim 15, wherein the third and fourth locations are on the outer surface of the tire at a location proximate to a second side edge of a radial belt section of the tire, the fourth location is circumferentially spaced from the third location.

18. The apparatus of claim 12, wherein the first thermal sensor is an infrared sensor.

19. The apparatus of claim 12, wherein the thermal sensor is configured for measuring over a fifty millisecond time period at least a five degree Celsius temperature difference between the first and second locations.

20. The apparatus of claim 12, wherein the signal processing device produces the processing device output signal representative of a potential damage condition of the tire only when at least an approximately five degree Celsius temperature difference between the first and second locations occurs for a time period greater than approximately ten minutes.

21. The apparatus of claim 12, wherein the signal processing device produces the processing device output signal representative of a potential damage condition of the tire only when at least a five degree Celsius temperature spike is sensed by the first thermal sensor, and the spike lasts for an increasingly longer amount of time over a predetermined time period.

22. The apparatus of claim 12, wherein the signal processing device produces the processing device output signal representative of a potential damage condition of the tire only when an increasing temperature difference between the first and second locations occurs over a predetermined amount of time.

23. The apparatus of claim 12, wherein the indication device is selected from the group consisting of a lamp, a light emitting diode, a gage, and an audio indicator.

24. An apparatus for monitoring the condition of a tire comprising:

a thermal array to be carried by a vehicle, the thermal array producing a first array location output signal representative of the temperature of a first array location on a tire, the thermal array producing a second array location output signal representative of the temperature of a second array location on the tire;

a signal processing device receiving the first and second array location output signals, the signal processing device producing a processing device output signal representative of a potential damage condition of the tire in response to a particular temperature difference between the first and second array locations as indicated by the first and second array location output signals; and an indication device receiving the processing device output signal and indicating to a user of the vehicle that the tire is experiencing the potential damage condition.

25. A method for monitoring the condition of a tire, comprising:

producing a first sensor output signal representative of the temperature at a first location on the outer surface of a tire;

producing a second sensor output signal representative of the temperature at a second location on the tire;

receiving the first and second sensor output signals;

producing a processing device output signal representative of a potential damage condition of the tire in response to a particular temperature difference indicated by the first and second sensor output signals; and indicating to a user that the tire is experiencing the potential damage condition in response to the processing device output signal.

26. The method as set forth in claim 25, further comprising the steps of:

producing a third sensor output signal representative of the temperature at a third location on the tire;

producing a fourth sensor output signal representative of the temperature at a fourth location on the tire; and producing a processing device output signal representative of a potential damage condition of the tire in response to a particular temperature difference indicated by the third and fourth output signals.

27. An apparatus for monitoring the condition of a tire, comprising:

a pair of sensors comprising a first and a second thermal sensor each carried by a vehicle, the first and second thermal sensors sensing the temperature at different locations on the tire;

a signal processing device in communication with the first and second thermal sensors, the signal processing device producing a processing device output signal representative of a potential damage condition of the tire; and an indicator device in communication with the signal processing device and indicating to a user of the vehicle that the tire is experiencing the potential damage condition.

28. The apparatus of claim 27, wherein the processing device output signal is produced in response to a particular temperature difference between the temperature sensed by the first thermal sensor and the temperature sensed by the second thermal sensor.

29. The apparatus of claim 28, wherein the particular temperature difference is at least 5 degree Celsius.

30. The apparatus of claim 27, wherein the signal processing device output signal representative of a potential damage condition of the tire is produced only when at least an approximately 5 degree Celsius temperature difference existing between temperatures measured by the first and second thermal sensors occurs for a time period greater than approximately 10 minutes.

31. An apparatus for monitoring the condition of a tire, comprising: at least two sensors carried by a vehicle and positioned so as to sense the temperature at locations on at least two different tires of the vehicle such that the sensors are configured for measuring the temperature difference between different locations on one tire and for measuring the temperature difference between different locations on the other tire;

a signal processing device in communication with the sensors, the signal processing device producing a processing device output signal representative of a potential damage condition of a tire; and an indicator device in communication with the signal processing device and indicating to a user of the vehicle that at least one tire is experiencing the potential damage condition.

32. The apparatus of claim 31, wherein at least four sensors are carried by the vehicle and positioned so as to sense the temperature at locations on four different tires of the vehicle.

33. The apparatus of claim 31, wherein the temperature at locations on both of the front tires of the vehicle are measured, and wherein the processing device output signal representative of a potential damage condition of the tire is produced upon comparison of the temperatures measured on the two different front tires of the vehicle.

34. The apparatus of claim 31, wherein the temperature at locations on the two back tires of the vehicle are measured, and wherein the processing device output signal representative of a potential damage condition of the tire is produced based on the temperatures sensed on the two different back tires of the vehicle.

* * * * *